United States Patent [19]
Cacas et al.

[11] Patent Number: 6,023,656
[45] Date of Patent: Feb. 8, 2000

[54] METHOD FOR DETERMINING THE EQUIVALENT FRACTURE PERMEABILITY OF A FRACTURE NETWORK IN A SUBSURFACE MULTI-LAYERED MEDIUM

[75] Inventors: Marie-Christine Cacas, Nanterre; Sylvain Sarda; Bernard Bourbiaux, both of Rueil-Malmaison; Jean-Claude Sabathier, Louveciennes, all of France

[73] Assignee: Institut Francais du Petrole, Cedex, France

[21] Appl. No.: 09/000,972

[22] Filed: Dec. 30, 1997

[30] Foreign Application Priority Data

Dec. 30, 1996 [FR] France ..................... 9616330

[51] Int. Cl.$^7$ .................................. G06F 19/00
[52] U.S. Cl. ............................................ 702/12
[58] Field of Search .................. 702/7, 8, 11, 12, 702/13, 16, 14; 367/72, 73

[56] References Cited

U.S. PATENT DOCUMENTS

| | | | |
|---|---|---|---|
| 4,442,710 | 4/1984 | Meng | 702/12 |
| 4,797,821 | 1/1989 | Petak et al. | 702/12 |
| 5,070,457 | 12/1991 | Poulsen | 702/12 |

FOREIGN PATENT DOCUMENTS

| | | |
|---|---|---|
| 2725794 | 4/1996 | France . |
| 2725814 | 4/1996 | France . |
| 2733073 | 10/1996 | France . |

OTHER PUBLICATIONS

Oil Recovery by Imbibition in Low–Permeability Chalk; Louis Cuiec; Bernard Bourblaux and Francois Kalaydjian; Sep. 1994; pp. 200–208.

Experimental Study of Cocurrent and Coutercurrent Flows in Natural Porous Media; Bernard J. Boublaux and Francois J. Kalaydjian; Aug. 1990; pp. 361–368.

Tools assist in mapping fractured reservoirs; Santiago M. Reynolds; Jun. 4, 1990; pp. 106–111.

Modeling Fracture Flow With a Stochastic Discrete Fracture Network: Calibration and Validation 1. The Flow Model; M.C. Cacas, E. Ledoux, G. DeMarsily, B. Tillie A. Barbreau, E. Durand, B. Feuga, and P. Peaudecerf; Vo. 26, No. 3 pp. 479–489; Mar. 1990.

A Model for Steady Fluid Flow in Random Three–Dimensional Networks of Disc–Shaped Fractures; Jane C.S. Long, Peggy Gilmour, and Paul A. Witherspoon; Vo. 21, No. 8 pp. 1105–1115; Aug. 1985.

Implicit Compositional Simulation of Single–Porosity and Dual–Porosity Reservoris; K.H. Coats; Feb. 1989; pp. 239–275.

Typical Features of a Multipurpose Reservoir Simulator; P. Quandalle and J.C. Sabathior; Nov. 1989; pp. 475–480.

Fractured Reservoir Simulation; L. Kent Thomas; Thomas N. Dixon and Ray G. Pierson; Feb. 1983; pp. 42–54.

Structural and Tectonic Modelling and its Application to Petroleum Geology; R.M. Larsen; H. Brekke; T.T. Larsen and E.Talleraas; 1992; pp. 364–380.

The Bahavior of Naturally Fractured Reservoirs; J.E. Warren; P.J. Root; Sep. 1963; pp. 245–255.

*Primary Examiner*—Donald E. McElheny, Jr.
*Attorney, Agent, or Firm*—Antonelli, Terry, Stout & Kraus, LLP

[57] ABSTRACT

Method for determining the equivalent fracture permeability of a fracture network in a subsurface multi-layered medium from a known representation of this network. The equivalent fracture permeability of a fractured network in a subsurface multi-layered medium, is determined by discretizing with a specific procedure each fracture (F) of the fracture network in fracture elements (R) (such as rectangles for example) and defining nodes N representing interconnected fracture elements in each layer of the medium and determining fluid flows (steady-state flows e.g.) through the discretized network while imposing boundary pressure conditions and fluid transmissivities to each couple of neighboring nodes. The method allows for a systematic linking of fractured reservoir characterization models with dual-porosity simulators in order to create a more realistic modeling of a fractured subsurface geological structure. The method can be implemented for example in oil production by reservoir engineers for obtaining reliable flow predictions.

4 Claims, 8 Drawing Sheets

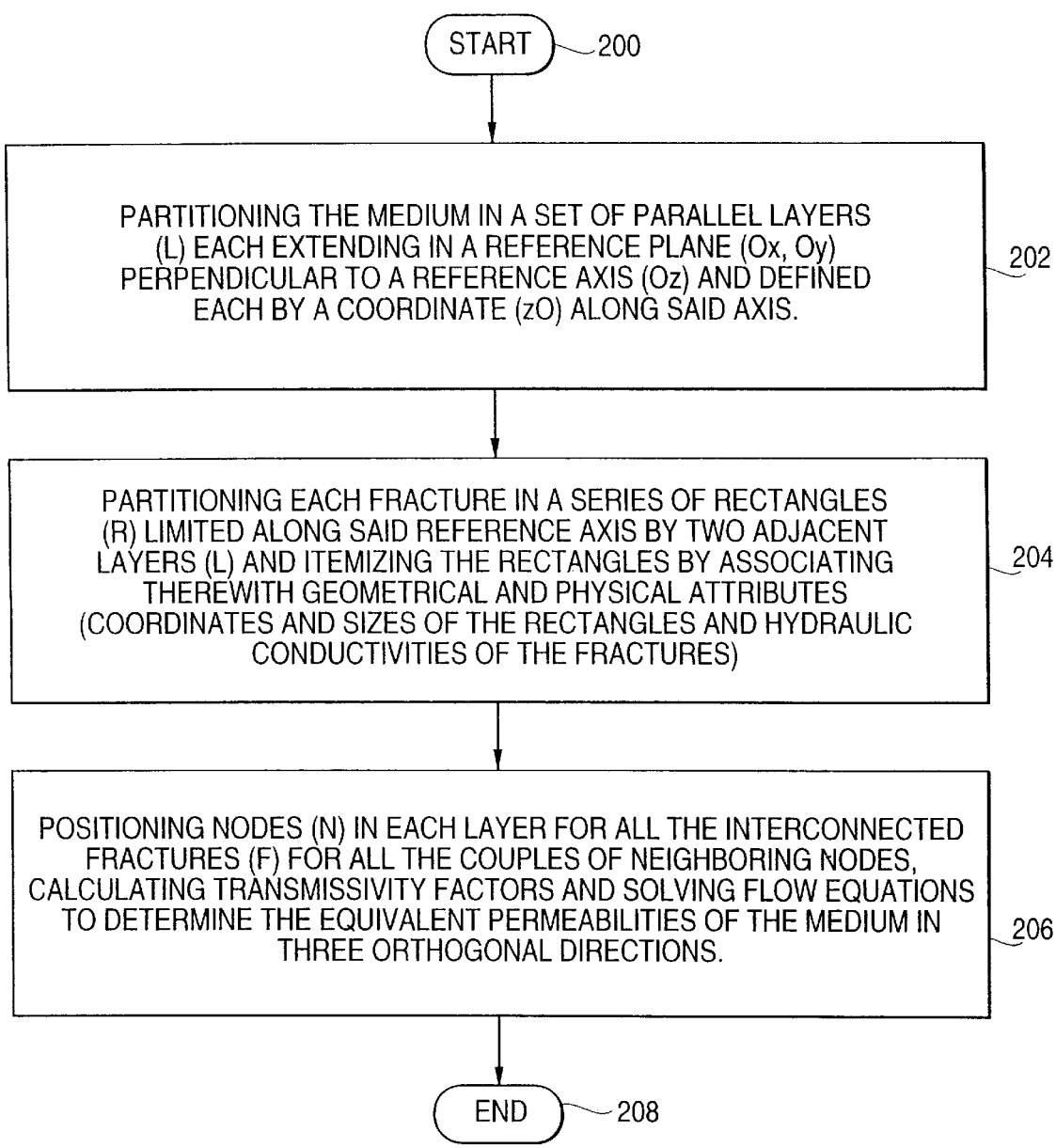

METHOD FOR DETERMINING THE EQUIVALENT FRACTURE PERMEABILITY OF A FRACTURE NETWORK IN A SUBSURFACE MULTI-LAYERED MEDIUM

FIELD OF THE INVENTION

The invention pertains to a method for determining the equivalent fracture permeability of a fractured network in a subsurface fractured multi-layered medium useful for creating more realistic modeling of a fractured subsurface geological structure. The method can be implemented for example by reservoir engineers for obtaining reliable oil flow predictions.

BACKGROUND OF THE INVENTION

Fractured reservoirs are an extreme kind of heterogeneous reservoirs, with two contrasted media, a matrix medium containing most of the oil in place and having a low permeability, and a fracture medium usually representing less than 1% of the oil in place and being highly conductive. The fracture medium itself may be complex, with different fracture sets characterized by their respective fracture density, length, orientation, tilt and aperture. 3D images of fractured reservoirs are not directly usable as a reservoir simulation input. Representing the fracture network in reservoir flow simulators was long considered as unrealistic because the network configuration is partially unknown and because of the numerical limitations linked to the juxtaposition of numerous cells with extremely-contrasted size and properties. Hence, a simplified but realistic modeling of such media remains a concern for reservoir engineers.

The "dual-porosity approach" as taught for example by Warren, J. E. et al "The Behavior of Naturally Fractured Reservoirs", SPE *Journal* (September 1963), 245–255, is well-known in the art to interpret the single-phase flow behavior observed when testing a fractured reservoir. According to this basic model, any elementary volume of the fractured reservoir is modeled as an array of identical parallelepipedic blocks limited by an orthogonal system of continuous uniform fractures oriented along one of the three main directions of flow. Fluid flow at the reservoir scale occurs through the fracture medium only and locally fluid exchanges occur between fractures and matrix blocks.

Numerous fractured reservoir simulators have been developed using such a model with specific improvements concerning the modeling of matrix-fracture flow exchanges governed by capillary, gravitational, viscous forces and compositional mechanisms, also the consideration of matrix to matrix flow exchanges (dual permeability dual-porosity simulators). Various examples of prior art techniques are referred to in the following references.

Thomas, L. K. et al: "Fractured Reservoir Simulation," SPE *Journal* (February 1983) 42–54;

Quandalle, P et al: "Typical Features of a New Multipurpose Reservoir Simulator", SPE 16007 presented at the 9th SPE Symposium on Reservoir Simulation held in San Antonio, Tex., Feb. 1–4, 1987;

Coats, K. H.: "Implicit Compositional Simulation of Single-Porosity and Dual-Porosity Reservoirs," paper SPE 18427 presented at the SPE Symposium on Reservoir Simulation held in Houston, Tex., Feb. 6–8, 1989.

A problem met by reservoir engineers is to parameterize this basic model in order to obtain reliable flow predictions. In particular, the basic fracture and matrix petrophysical properties as well as the size of matrix blocks have to be known for each cell of the flow simulator. Whereas matrix permeability can be estimated from cores, the permeability of the fracture network contained in the cell, i.e. the equivalent fracture permeability, cannot be estimated in a simple way and requires taking the geometry and properties of the actual fracture network into account.

A direct method is known for determining steady-state flow in a fracture network. It involves use of conventional fine regular grids discretizing both the fractures and the matrix blocks of the parallelepipedic fractured rock volume considered. For several reasons this known method does not provide reliable results except if the fractured rock volume is discretized using a grid with a drastically-high number of cells, which requires huge computing ressources.

Other specific models which compute equivalent permeabilities of 2D or 3D fracture networks, are also known for example from:

Odling, N. E.: "Permeability of Natural and Simulated Fracture Patterns," *Structural and Tectonic Modelling and its Application to Petroleum Geology* NPF Special Publication 1, 365–380, Elsevier. Norwegian Petroleum Society (NPF) 1992;

Long, J. C. S., et al; "A Model for Steady Fluid Flow in Random Three-Dimensional Networks of Disc-Shaped Fractures," *Water Resources Research* (August 1985) vol. 21, No. 8, 1105–1115;

Cacas, M. C. et al; "Modeling Fracture Flow With a Stochastic Discrete Fracture Network: Calibration and Validation. 1. The Flow Model," *Water Resources Research* (March 1990) vol. 26, No. 3;

Billaux, D.: <<Hydrogéologie des milieux fracturés. Géométrie, connectivité et comportement hydraulique>> PhD Thesis, presented at the Ecole Nationale Supérieure des Mines de paris; Document du BRGM N°186, Editions du BRGM, 1990;

Robinson, P. C.: <<Connectivity, Flow and Transport in networks Models of Fractured Media>>, PhD Thesis, St Catherine's College, Oxford University, Ref.: TP1072, May 1984.

SUMMARY OF THE INVENTION

The invention deals with a method for determining the equivalent fracture permeability of a fractured network in a subsurface multi-layered medium.

The method distinguishes in that it comprises the steps of:

discretizing the fracture network in fracture elements (such as rectangles for example) and defining nodes representing interconnected fracture elements in each layer of the medium; and determining fluid flows through the discretized network while imposing boundary pressure conditions, and fluid transmissivities to each couple of neighboring nodes.

The method can be more precisely defined as including the steps of:

partitioning the medium in a set of parallel layers each extending in a reference plane perpendicular to a reference axis and defined each by a co-ordinate along said axis;

partitioning each fracture in a series of rectangles limited along said reference axis by two adjacent layers and itemizing the rectangles by associating therewith geometrical and physical attributes such as co-ordinates and sizes of the rectangles and hydraulic conductivities of the fractures;

positioning nodes in each layer for all the interconnected fractures; and for all the couples of neighboring nodes, calculating transmissivity factors and solving flow equations to determine the equivalent permeabilities of the medium in three orthogonal directions.

In a preferred embodiment, equivalent permeability of the medium includes directly determining equivalent permeability anisotropy tensor and calibrating absolute values of permeability from well tests results.

The method as summarized allows for systematically linking fractured reservoir characterization models and dual-porosity simulators in order to create a more realistic modeling of a fractured subsurface geological structure. The method can be implemented for example in oil production by reservoir engineers for obtaining reliable flow predictions.

BRIEF DESCRIPTION OF THE DRAWINGS

Other features and advantages of the method according to the invention will be clear from reading the description hereafter of embodiments given by way of non limitative examples, with reference to the accompanying drawings where:

FIGS. 10A and 10B illustrate the method of the present invention.

DESCRIPTION OF THE PREFERRED EMBODIMENTS

Figure 1:
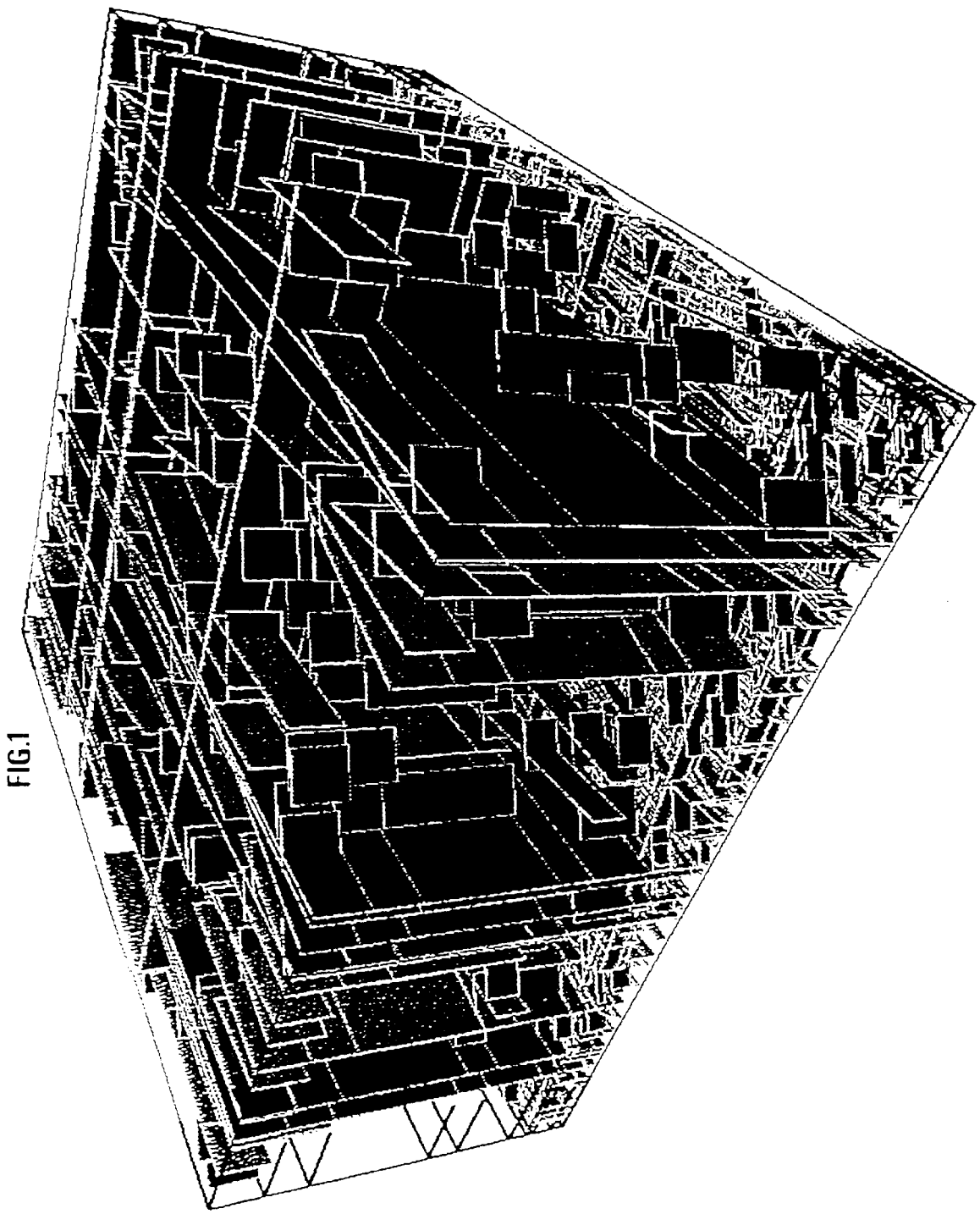
FIG. 1 shows for example a 3D image of a fracture network stochastically generated from observations of and measurements on a sandstone outcrop.

The equivalent permeabilities of a 3D fracture network is determined hereafter by using a numerical technique based on the known "resistor network" method as shown for example in the prior reference to Odling, N. E. In the present method the matrix is supposed to be impermeable in order to be consistent with the dual-porosity approach. In reservoir simulators, matrix-to-fracture and matrix-to-matrix flows are actually computed separately from fracture flows.

The 3D fracture network considered is assumed to represent in a volume equal to a reservoir cell the real distribution of fractures given by integration of fracture attributes of the field in a characterization model. The main objective of single-phase flow computations on the 3D fracture network is to evaluate the equivalent permeability anisotropy (Kv/Kh and Ky/Kx) of the fracture cell considered, which is an important parameter controlling reservoir multiphase flow behavior. The equivalent permeability values drawn from such computations would in practice be compared with the results of well tests in order to calibrate fracture attributes such as fracture hydraulic conductivities (or equivalent hydraulic apertures), which may be poorly defined a priori.

In addition, equivalent permeability results can be used to determine a permeability tensor, the main directions of which enable an optimal orientation of the reservoir model grid. However, to obtain such information, specific boundary conditions are required. Lateral no-flow boundary conditions imposed on the four lateral faces of the parallelepipedic volume studied do not give access to non-diagonal terms of the equivalent permeability tensor, whereas linearly-varying potentials (or pressures) on lateral faces enable to impose the direction of potential gradient within the anisotropic medium and to directly derive non-diagonal permeability terms from lateral flow rates.

The techniques to integrate natural fracturing data into fractured reservoir models are well known in the art. Fracturing data are mainly of a geometric nature and include measurements of the density, length, azimuth and tilt of fracture planes observed either on outcrops, mine drifts, cores or inferred from well logging. Different fracture sets can be differentiated and characterized by different statistical distributions of their fracture attributes. Once the fracturing patterns have been characterized, numerical networks of those fracture sets can be generated using a stochastic process respecting the statistical distributions of fracture parameters. Such process are disclosed for example in patents FR-A-2,725,814, 2,725,794 or 2,733,073 of the applicant.

The method according to the invention is applied to images of fractured geological structures of various size or volume and/or at various locations which are generated by a fracture model generator. Such an image is shown on FIG. 1.

INPUT DATA

Before developing the procedures recommended to determine equivalent hydraulic parameters of 3D fracture images, an important step is to define first a common input data structure for these images, so that they can be processed independently of the processing tool used to generate them.

Figure 3:
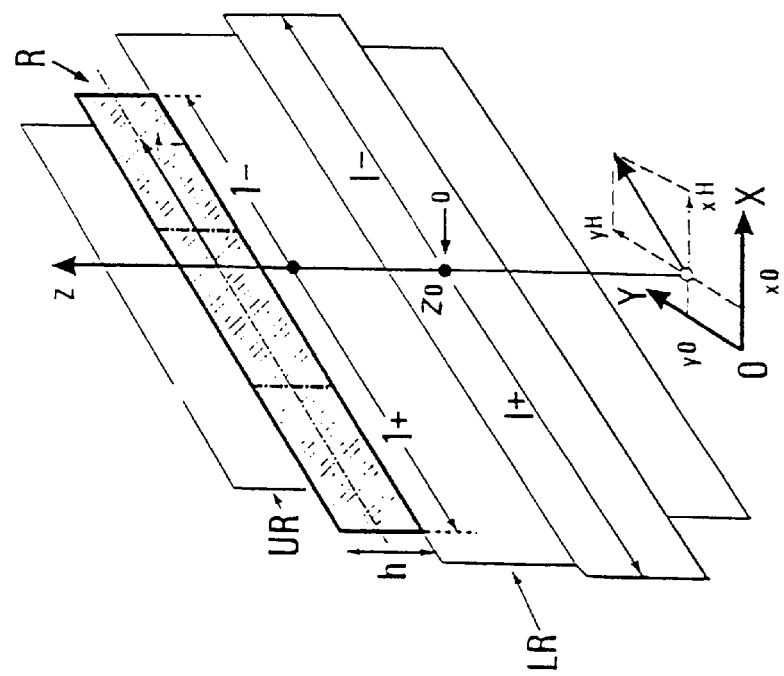
FIGS. 2, 3 show a fracture partitioned in a series of rectangles R.
Figure 2:
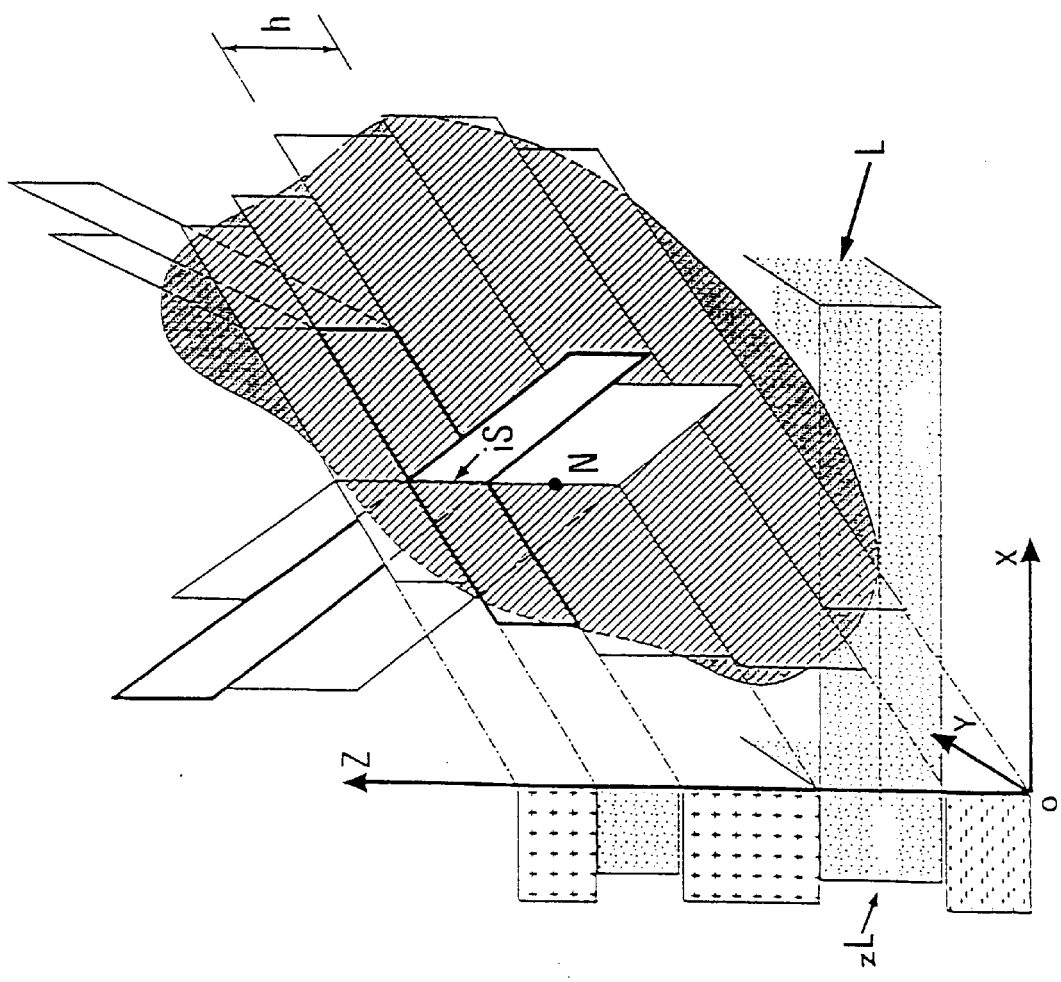

As shown on FIGS. 2, 3, fractures F are assumed to be substantially vertical (i.e. perpendicular to the layer limits). However, a same data structure can be applied to fractures slightly deviating from the vertical direction. The 3D image is discretized vertically complying with the actual geological layering if such information is available. If not, any arbitrary discretisation is applied to the image. Each horizontal layer L is characterized by its vertical coordinate zL in the reference system of coordinates (OX, OY, OZ).

For each layer L, a series of rectangles R has to be defined. Each rectangle consists in a fracture plane element comprised between the limits of a given layer. Hence, each natural fracture consists in a set of superimposed rectangles R and is assigned an origin (fracture origin). Each rectangle is defined by:

the three coordinates (xO, yO, zO) of the rectangle origin O. For a given natural fracture, all the origin points of the constitutive rectangles are situated on the same vertical (or highest dip) line drawn from the fracture origin;

the co-ordinates of the horizontal unit vector $\vec{i}$ (xH, yH) and of the vertical unit vector $\vec{j}$ (xV, yV) defining the orientation of the rectangle in the reference system of co-ordinates, with x Vertical and y Vertical being zero in case of vertical fractures but considered as input data to be able to deal with non-vertical fractures;

the two algebraic horizontal lengths l– and l+ separating the origin of the rectangle and the two lateral (vertical) limits of this rectangle;

the height h of the rectangle, that is the length of the rectangle along direction $\vec{j}$ which is the layer thickness if discretisation along direction $\vec{j}$ fits the geology;

the hydraulic conductivity c derived from the application of Darcy's law to fracture flow (for a pressure gradient $$\frac{\Delta P}{l},$$

the flow rate in the fracture with a height h is $$\frac{ch}{\mu} \cdot \frac{\Delta P}{l},$$

$\mu$ being the fluid viscosity). The conductivity c is given by the relation c=k.a where k=$a^2$/12 (using Poiseuille's idealized representation of fractures) is the intrinsic permeability of the fracture and a its equivalent hydraulic aperture a. The hydraulic conductivity c is a reference value given for a direction of the maximum horizontal stress parallel to the fracture direction;

the two upper and lower neighboring rectangles UR, LR;

the fracture set FS to which the rectangle considered belongs to;

the orientation angle $\alpha_O$ of the direction of maximum horizontal stress taken from (OX) axis in the reference system of coordinates;

for each fracture set, a correlation table correlating 1) the angle between the direction of maximum horizontal stress and fracture direction (azimuth) with 2) the hydraulic conductivity c or equivalent hydraulic aperture $\alpha$ previously defined. "Horizontal" and "vertical" stand in the context for directions respectively parallel and perpendicular to the limits of layers which here are assumed horizontal. Layer limits discretise fracture planes in the <<vertical>> direction. It must be pointed out that the aforesaid input data 1) are suitable for all the existing software tools used for characterizing and generating fracture and 2) could be used to discretise a network of slightly non-vertical fractures, i.e. not perpendicular to layer limits.

OPERATING PROCEDURES

Starting from the so-codified 3D image, operating procedures and validation tests of the method for computing permeability anisotropy of the fracture network taken as a whole, will be hereafter presented. The numerical procedure to calculate the equivalent permeabilities of a 3D fracture network is described.

The problem is to find the flow rate distribution in the network for the following boundary conditions on the limits of the studied parallelepipedic volume i.e. fixed pressures imposed on two opposite faces and pressures varying linearly on the four lateral faces (between the values imposed on the two other faces).

The main steps are summarized hereafter:
1). Network Discretization

Figure 5:
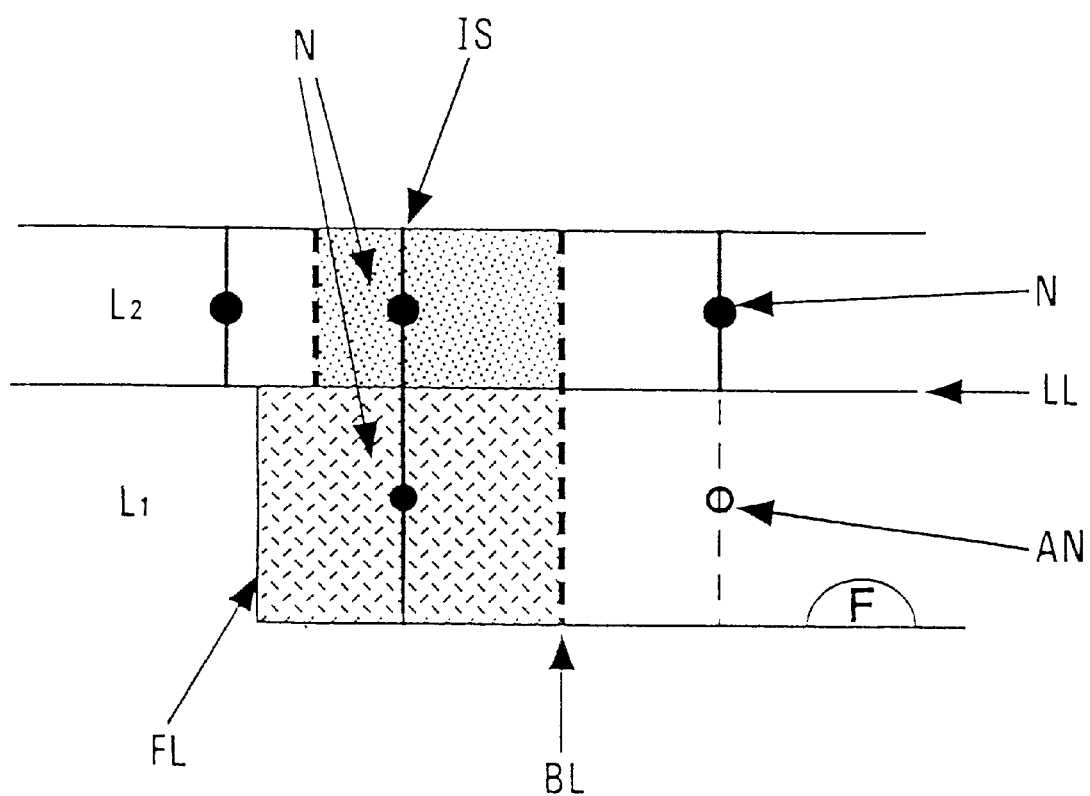
FIG. 5 shows the preferred mode to discretize a fracture plane.

Using the definitions given for the input data structure, the fracture network is discretized as a series of "nodes" N each node being placed at the middle of the intersection segments IS of two rectangles R (i.e. of two fracture planes within a given layer). As shown on FIG. 5, additional nodes AN are placed above and below the preceding nodes N to represent other rectangles discretizing the fractures and to minimize flow lengths within a given fracture. BL on FIG. 5 is a lateral limit of two neighboring fracture cells.

Once discretized, a screening procedure is applied to this fracture network in order to eliminate isolated nodes or groups of nodes with no connection with any of the lateral limits FL of the 3D volume studied, because such <<screened>> fractures do not contribute to fluid transport and may impede the solving procedures used to find pressures at fracture nodes during a steady-state flow through the network.

2) Calculation of Transmissivities

A transmissivity factor T is calculated for each pair of connected nodes using the relation:

$$T = \frac{ch}{l} = \frac{kah}{l}$$

where c is the fracture hydraulic conductivity, k, the fracture intrinsic permeability, a, the fracture aperture; h, the fracture height, and l, the distance between two fracture nodes.

Figure 6:
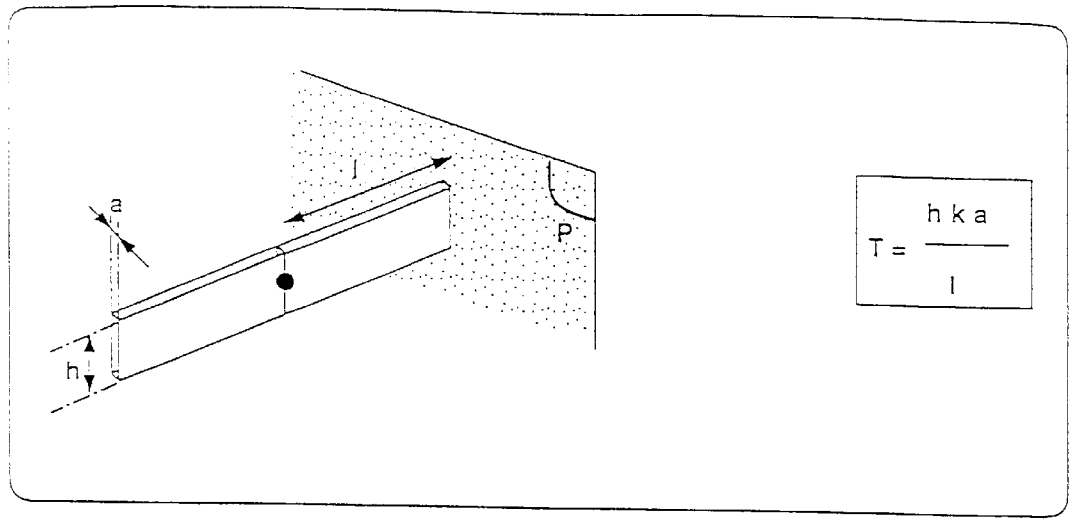
FIGS. 6, 7, 8, and 9 schematically illustrate computation of transmissivity factors for different positions of nodes with respect to one another or with a boundary.
Figure 7:
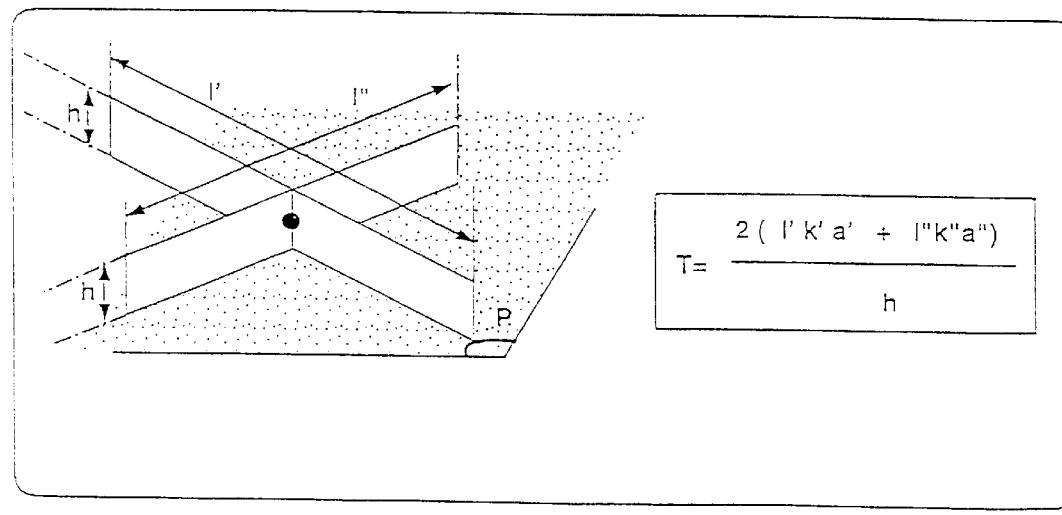

Different situations have to be considered according to the respective position of the two nodes. For nodes within the same layer (FIG. 6), the horizontal transmissivity factor T is obtained directly as the distance (l1+l2) separating the two nodes in the flow direction (FIG. 7). For nodes in two different layers (FIG. 9), the vertical transmissivity factor is the arithmetic sum of the transmissivity factors (T'+T'') referring to the two fracture plane elements of the superimposed fracture cells. It involves a flow length equal to the half sum of the two layer thicknesses .h1 and h2. For additional nodes as previously defined, connected via a single fracture plane, a single transmissivity factor is calculated for this fracture plane element.

The transmissivity factor T between a node and a limit of the 3D volume studied is expressed in a similar way as between two nodes, with the following two cases.

Figure 8:
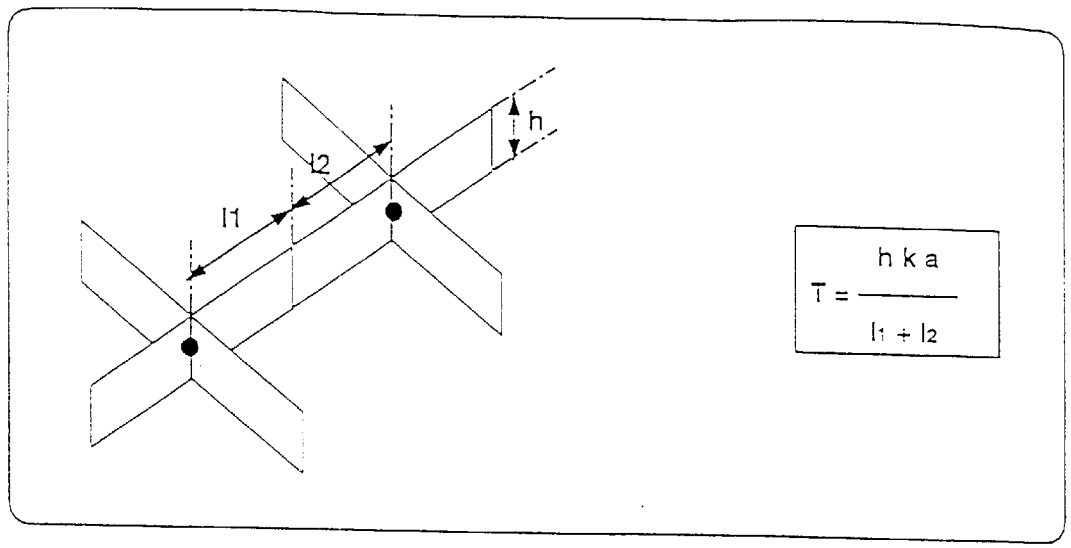

For a lateral vertical limit, the transmissivity factor T can be expressed directly for a single fracture plane element (FIG. 8), and as the sum of two transmissivities if two fracture planes link the node and the limit.

Figure 9:
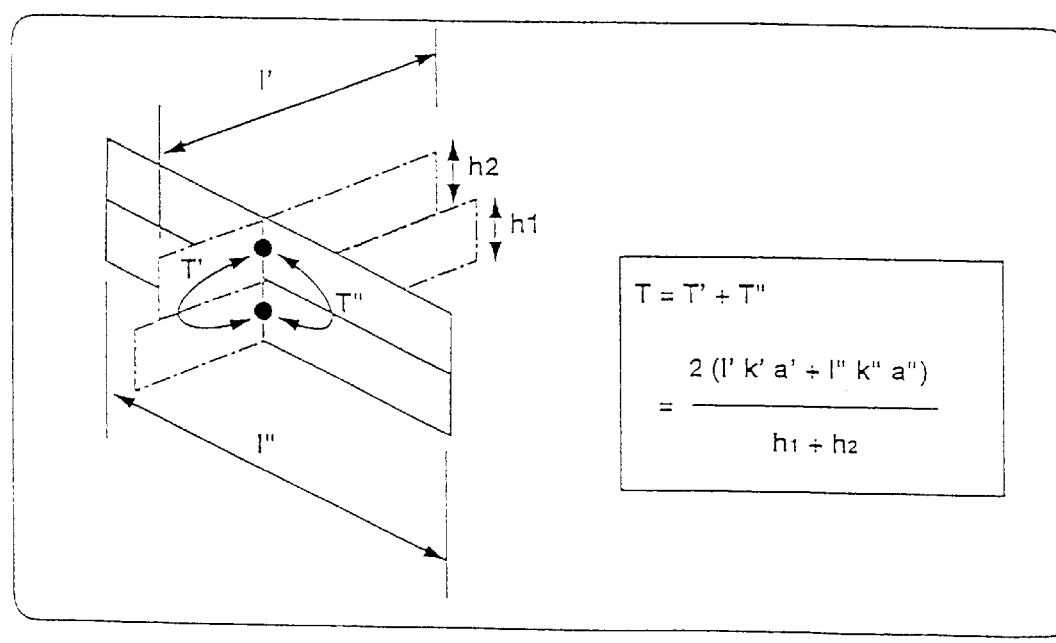

For a horizontal bottom or top limit, the vertical transmissivity factor can be expressed considering a flow length equal to half the layer thickness (FIG. 9).

3) Flow Equations

At steady state, an incompressible single-phase flow through the fracture network is determined by solving a set of n equations. one for each node, as well known in the art. Each equation expresses that the total flow rate is zero at each fracture node. For calculating a permeability tensor, it is considered a constant pressure is imposed on each of the upstream and downstream limits. A pressure varying linearly as a function of the position between upstream and downstream limits is imposed.

The matrix of equivalent permeability (Kij) previously determined is diagonalized to calculate the principal directions of flow with the respective equivalent permeabilities in these directions.

In practice, the problem is often limited to that of finding the principal horizontal directions of flow U and V since the direction perpendicular to layer limits (generally vertical) is always taken as z axis. In such a case, only the extra-diagonal terms $K_{xy}$ and $K_{yx}$ need to be calculated which can be obtained with the following mixed boundary conditions:

horizontal flows are computed with impermeable bottom and top faces, and linearly-varying pressures on the vertical faces parallel to flow direction;

vertical flow is computed with all lateral faces being impermeable.

Thus, a simplified permeability tensor is obtained from which the principal horizontal directions of flow U and V are easily derived:

$$\begin{pmatrix} K_{xx} & K_{yx} & 0 \\ K_{xy} & K_{yy} & 0 \\ 0 & 0 & K_{zz} \end{pmatrix}$$

Validation

The method has been successfully validated against the already mentioned reference single-phase flow computations performed with a conventional reservoir simulator. The reference computations were obtained on fine regular grids discretizing the fractures as well as the matrix blocks of the parallelepipedic fractured rock volume considered. For a given low direction, fixed injection pressure and production pressure were imposed on the inlet and outlet faces and the resulting flow rate was calculated with lateral no-flow conditions.

Three steps were followed, to validate the computation of:
the equivalent vertical permeability of a rock volume crossed by a single fracture, the latter being represented by several nodes corresponding to the intersections with small disconnected fractures;
equivalent horizontal permeabilities (in a 2D flow geometry) and the main flow directions;
equivalent permeabilities and permeability anisotropy in a simple network involving 3D flow geometry.

The results obtained for the third step (for a 3D flow geometry) are given in the following table. For th horizontal flow directions a reference analytical solution can also be calculated since the flow geometry is a 2D flow in these directions (3D flow geometry concerns the z direction).

| Equivalent permeabilities (md) | FINE GRID simulation | PRESENT METHOD | ANALYTICAL solution |
|---|---|---|---|
| Kx | 0.119 | 0.120 | 0.120 |
| Ky | 0.224 | 0.227 | 0.226 |
| Kz | 0.255 | 0.267 | |
| Anisotropy $Kz/(KxKy)^{0.5}$ | 1.56 | 1.62 | |

It is the clear that the results obtained by the disclosed method are very close to the corresponding values obtained with the analytical solution and the fine grid simulation for directions X and Y.

In addition, the difference in the vertical equivalent permeability values involving 3D flow remains acceptable. Hence, the anisotropy ratio, equal to 1.6, is satisfactorily predicted by the method with a very limited number of cells.

The method according to the invention which provides easily transposed representation of a natural fracture network, is well adapted for fracture flow computations. It can also be useful for improving the original image of the fracture network. Such image is actually obtained form a stochastic fracture generator using as input results of integration of filed fracturing data in a fracture characterization model as shown in the already cited patents FR-A-2,725, 814, 2,725,794 or 2,733,073 to the applicant. Such images once discretized with the procedure of the invention can be easily modified tofit with geological rules. For example systematic interruption of a given fracture against another fracture set can be accounted for in the original image by canceling fracture plane elements of a given set which extends beyond the intersected fractures of the other set.

Figure 10A:
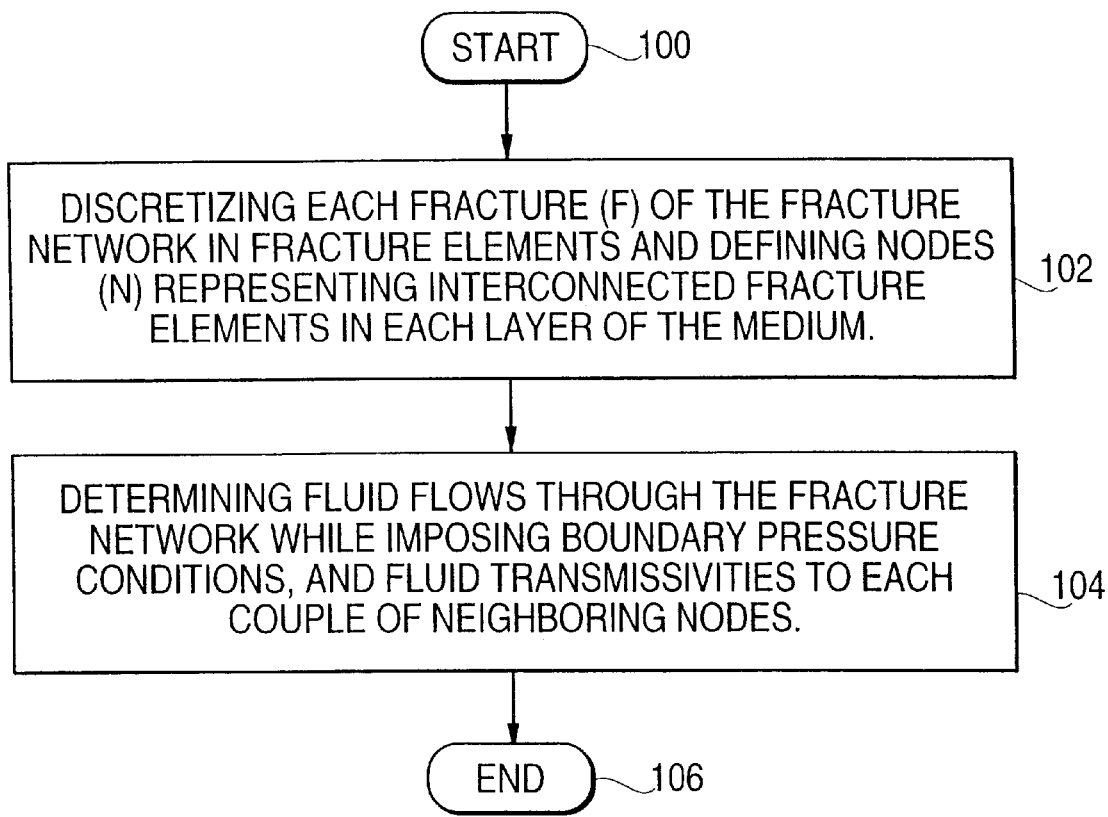
Figure 1:
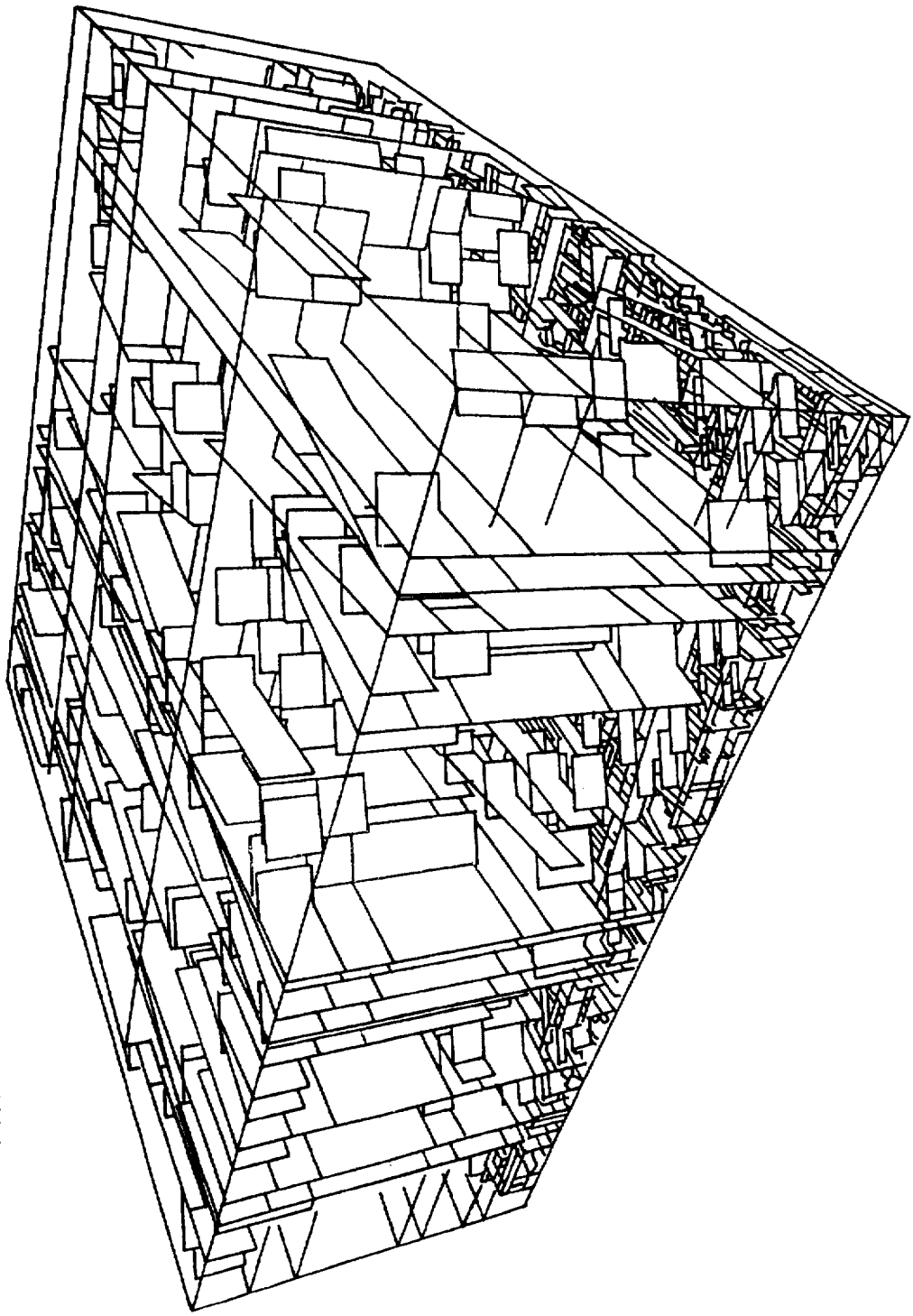
Figure 4:
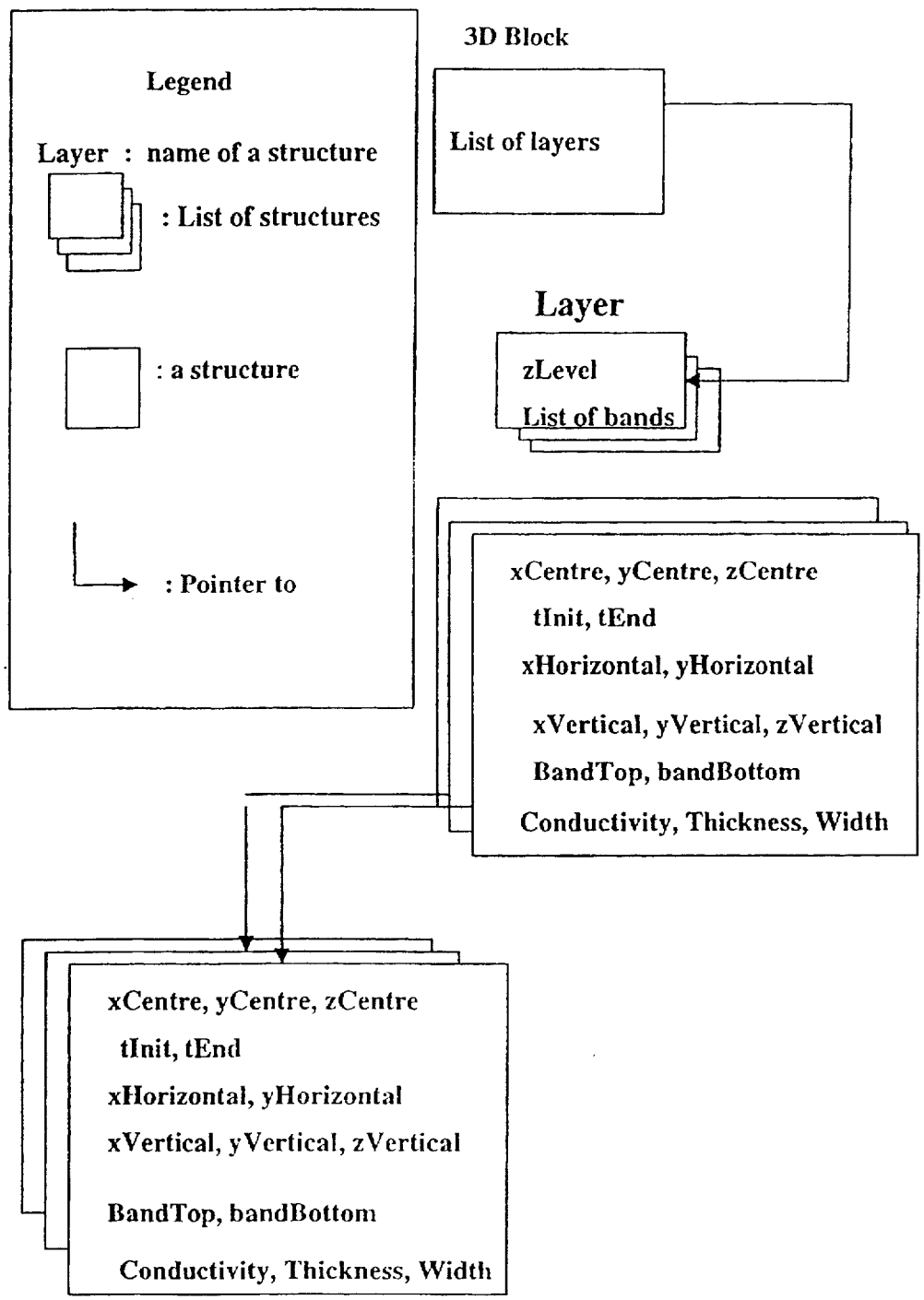

FIG. 10A illustrates the basic method of the present invention. The method proceeds from starting point 100 to point 102 where discretizing each fracture (F) of the fracture network in fracture elements and defining nodes (N) representing interconnected fracture elements in each layer of the medium occurs. The method proceeds to point 104 where determining fluid flows through the fractured network while imposing boundary pressure conditions, and fluid transmissivities to each couple of neighboring nodes occurs. The method proceeds to endpoint 106.

FIG. 10B illustrates a more specific aspect of the method of the present invention. The method proceeds from point 200 to point 202 where petitioning the medium in a set of parallel layers (L) each extending in a reference plane (Ox, Oy) perpendicular to a reference axis (Oz) and defined each by a coordinate (Zo) along said axis occurs. The method proceeds to point 204 where petitioning each fracture in a series of rectangles (R) limited along said reference axis by two adjacent layers (L) and itemizing rectangles by associating therewith geometrical and physical attributes (co-ordinates and sizes of the rectangles and hydraulic conductivities of the fractures) occurs. The method proceeds to point 206 where positioning nodes (N) and each layer for all the interconnected fractures (F) for all the couples of neighboring nodes, calculating transmissivity factors and solving flow equations to determine the equivalent permeabilities of the medium in three orthogonal directions occurs. The method proceeds to endpoint 208.

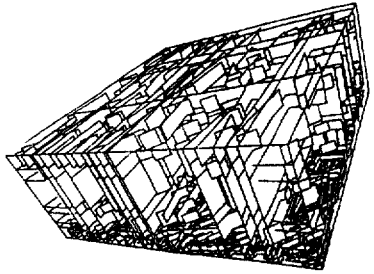

We claim:

1. Method for determining the equivalent fracture permeability of a fractured network in a subsurface fractured multi-layered medium, from a predetermined representation of said network, comprising the steps of discretizing each fracture (F) of the fracture network in fracture elements and defining nodes (N) representing interconnected fracture elements in each layer of the medium; and determining fluid flows through the fracture network while imposing boundary pressure conditions, and fluid transmissivities to each couple of neighboring nodes.

2. A method according to claim 1, comprising the steps of:

partitioning the medium in a set of parallel layers (L) each extending in a reference plane (Ox, Oy) perpendicular to a reference axis (Oz) and defined each by a co-ordinate (zO) along said axis;

partitioning each fracture in a series of rectangles (R) limited along said reference axis by two adjacent layers (L) and itemizing the rectangles by associating therewith geometrical and physical attributes;

positioning nodes (N) in each layer for all the interconnected fractures (F); and for all the couples of neighboring nodes, calculating transmissivity factors and solving flow equations to determine the equivalent permeabilities of the medium in three orthogonal directions.

3. A method according to claim 1, wherein the equivalent permeability of the medium includes directly determining an equivalent permeability tensor and calibrating absolute values of permeability from well tests results.

4. A method according to claim 2 wherein said geometrical and physical attributes are co-ordinates and sizes of the rectangles and hydraulic conductivities of the fractures.

* * * * *

UNITED STATES PATENT AND TRADEMARK OFFICE
CERTIFICATE OF CORRECTION

Figure 4:
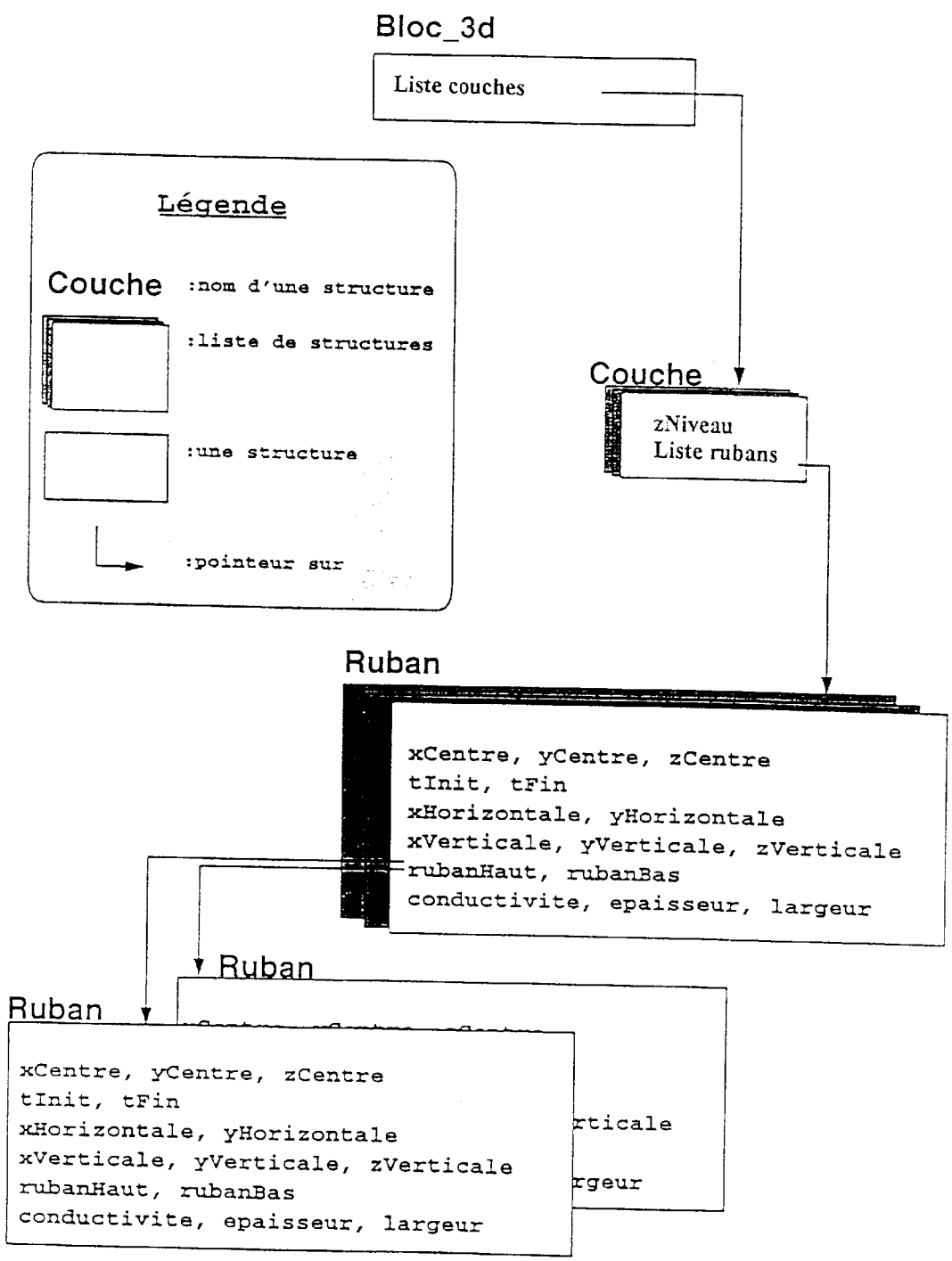
FIG. 4 shows the input data structure itemizing the fracture attributes.

PATENT NO.  : 6,023,656
DATED       : February 8, 2000
INVENTOR(S) : Marie-Christine CACAS et al It is certified that error appears in the above-identified patent and that said Letters Patent is hereby corrected as shown below:

Please substitute the attached Fig. 1 (showing black lines and white background) for Fig. 1 as published (showing white lines and black background).
Please substitute the attached Fig. 4 (showing English language legends) for Fig. 4 as published (showing French language legends).
The title page, should be deleted to be replaced with the attached title page.

Signed and Sealed this

Twenty-eighth Day of August, 2001

*Attest:*

*Attesting Officer*

NICHOLAS P. GODICI
*Acting Director of the United States Patent and Trademark Office*

United States Patent [19]
Cacas et al.

[11] Patent Number: 6,023,656
[45] Date of Patent: Feb. 8, 2000

[54] METHOD FOR DETERMINING THE EQUIVALENT FRACTURE PERMEABILITY OF A FRACTURE NETWORK IN A SUBSURFACE MULTI-LAYERED MEDIUM

[75] Inventors: Marie-Christine Cacas, Nanterre; Sylvain Sarda; Bernard Bourbiaux, both of Rueil-Malmaison; Jean-Claude Sabathier, Louveciennes, all of France

[73] Assignee: Institut Francais du Petrole, Cedex, France

[21] Appl. No.: 09/000,972

[22] Filed: Dec. 30, 1997

[30] Foreign Application Priority Data

Dec. 30, 1996 [FR] France .................... 9616330

[51] Int. Cl.$^7$ .................... G06F 19/00
[52] U.S. Cl. .................... 702/12
[58] Field of Search .................... 702/7, 8, 11, 12, 702/13, 16, 14; 367/72, 73

[56] References Cited

U.S. PATENT DOCUMENTS

| | | | |
|---|---|---|---|
| 4,442,710 | 4/1984 | Meng | 702/12 |
| 4,797,821 | 1/1989 | Petak et al. | 702/12 |
| 5,070,457 | 12/1991 | Poulsen | 702/12 |

FOREIGN PATENT DOCUMENTS

| | | |
|---|---|---|
| 2725794 | 4/1996 | France . |
| 2725814 | 4/1996 | France . |
| 2733073 | 10/1996 | France . |

OTHER PUBLICATIONS

Oil Recovery by Imbibition in Low-Permeability Chalk; Louis Cuiec; Bernard Bourblaux and Francois Kalaydjian; Sep. 1994; pp. 200–208.

Experimental Study of Cocurrent and Coutercurrent Flows in Natural Porous Media; Bernard J. Boublaux and Francois J. Kalaydjian; Aug. 1990; pp. 361–368.

Tools assist in mapping fractured reservoirs; Santiago M. Reynolds; Jun. 4, 1990; pp. 106–111.

Modeling Fracture Flow With a Stochastic Discrete Fracture Network: Calibration and Validation 1. The Flow Model; M.C. Cacas, E. Ledoux, G. DeMarsily, B. Tillie A. Barbreau, E. Durand, B. Feuga, and P. Peaudecerf; Vo. 26, No. 3 pp. 479–489; Mar. 1990.

A Model for Steady Fluid Flow in Random Three-Dimensional Networks of Disc-Shaped Fractures; Jane C.S. Long, Peggy Gilmour, and Paul A. Witherspoon; Vo. 21, No. 8 pp. 1105–1115; Aug. 1985.

Implicit Compositional Simulation of Single-Porosity and Dual-Porosity Reservoris; K.H. Coats; Feb. 1989; pp. 239–275.

Typical Features of a Multipurpose Reservoir Simulator; P. Quandalle and J.C. Sabathior; Nov. 1989; pp. 475–480.

Fractured Reservoir Simulation; L. Kent Thomas; Thomas N. Dixon and Ray G. Pierson; Feb. 1983; pp. 42–54.

Structural and Tectonic Modelling and its Application to Petroleum Geology; R.M. Larsen; H. Brekke; T.T. Larsen and E.Talleraas; 1992; pp. 364–380.

The Bahavior of Naturally Fractured Reservoirs; J.E. Warren; P.J. Root; Sep. 1963; pp. 245–255.

*Primary Examiner*—Donald E. McElheny, Jr.
*Attorney, Agent, or Firm*—Antonelli, Terry, Stout & Kraus, LLP

[57] ABSTRACT

Method for determining the equivalent fracture permeability of a fracture network in a subsurface multi-layered medium from a known representation of this network. The equivalent fracture permeability of a fractured network in a subsurface multi-layered medium, is determined by discretizing with a specific procedure each fracture (F) of the fracture network in fracture elements (R) (such as rectangles for example) and defining nodes N representing interconnected fracture elements in each layer of the medium and determining fluid flows (steady-state flows e.g.) through the discretized network while imposing boundary pressure conditions and fluid transmissivities to each couple of neighboring nodes. The method allows for a systematic linking of fractured reservoir characterization models with dual-porosity simulators in order to create a more realistic modeling of a fractured subsurface geological structure. The method can be implemented for example in oil production by reservoir engineers for obtaining reliable flow predictions.

4 Claims, 8 Drawing Sheets